No. 688,098. Patented Dec. 3, 1901.
K. KNAPPE.
WORM WHEEL CUTTING TOOL.
(Application filed July 31, 1901.)
(No Model.)

Witnesses:
Paul S. Hunter
Walton Harrison

Inventor
Karl Knappe
By Munn
Attorneys

UNITED STATES PATENT OFFICE.

KARL KNAPPE, OF REINICKENDORF, GERMANY, ASSIGNOR TO THE FIRM OF FRIEDRICH STOLZENBERG & CO., OF BERLIN-REINICKENDORF, GERMANY.

WORM-WHEEL-CUTTING TOOL.

SPECIFICATION forming part of Letters Patent No. 688,098, dated December 3, 1901.

Application filed July 31, 1901. Serial No. 70,386. (No model.)

*To all whom it may concern:*

Be it known that I, KARL KNAPPE, a subject of the Emperor of Germany, residing at Reinickendorf, near Berlin, in the Empire of Germany, have invented a new and useful Worm-Wheel-Cutting Tool, of which the following is a specification.

As is well known, a common worm-wheel cutter in the shape of a worm the winding turns of which are formed by a series of cutting-teeth having sides receding behind the cutting edges is very suitable for exactly cutting worm-wheels at the teeth, but this tool being very expensive its application is frequently rendered impossible.

This invention relates to a simple tool capable of replacing the said worm-wheel cutter while doing the same work. By this tool the cutting of worm-wheels is cheapened and even rendered possible if only one or a few wheels are to be cut.

According to my invention the cutting edges of the tool, similar to those of the worm-wheel cutter for shaping the teeth, are arranged on a single or several pieces of flat steel which are secured in the milling shaft of a machine-tool, such as a lathe or a milling-machine, and so on. Thereby the advantage is obtained that the flat steel tool with the cutting edges can be produced in a simpler manner than the worm-wheel cutter. Also this tool may be replaced at pleasure. It is very easy to so form the teeth of the flat steel tool as to cause their sides to recede behind the cutting edges. Preferably the teeth are arranged on two opposite edges of the tool, which latter in this case may be considered to be a slice cut from the worm-wheel cutter.

The new tool is illustrated in a mode of execution by the accompanying drawings, in which—

Figure 1:
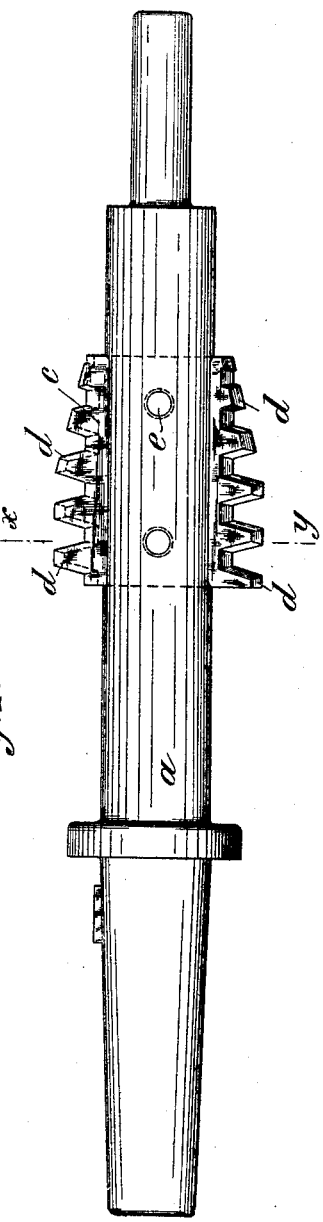
Figure 3:
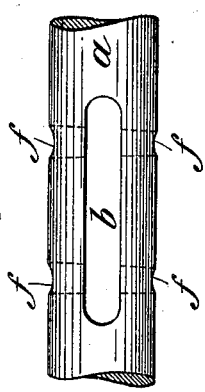
Figure 2:
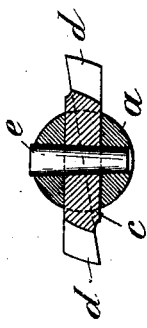

Figure 1 is an elevation of a milling-shaft with the new tool. Fig. 2 is a cross-section of the same on the line $xy$ in Fig. 1, and Fig. 3 is a side view of a part of the milling-shaft from which the tool is omitted.

Similar letters refer to similar parts throughout the several views.

In the mode of execution shown the milling-shaft $a$ is arranged for being attached to the spindle of some machine-tool and is provided with a slot $b$ for receiving the flat steel tool $c$. This tool is provided in the present case on both sides with teeth $d$, which replace those of the worm-wheel cutter and serve for cutting the teeth of the worm-wheel. To enable the tool, in a similar manner as the worm-wheel cutter, to be fed in the direction of the milling-shaft, the teeth $d$ are made to converge toward the center line of the shaft $a$ from the left to the right side, as shown.

The flat steel tool $c$, the teeth $d$ of which are preferably given sides receding behind the cutting edges, is capable of being replaced easily, as it is fastened in the shaft $a$ only by means of conical pins $e$, driven into similarly-shaped holes $f$. Of course other means may be employed for fastening the tool in the milling-shaft $a$. The tool may consist in several parts. Besides the advantages named above also the advantage is obtained that the same milling-shaft may be utilized for introducing different flat steel tools.

The new tool may be made in various ways without deviating from the spirit of my invention.

What I claim as my invention, and desire to secure by Letters Patent, is—

1. A worm-wheel-cutting tool, comprising a revoluble shaft provided with a longitudinal slot, a pair of oppositely-disposed comb-shaped cutters mounted in said slots, and a means for detachably holding said cutters in position.

2. A worm-wheel-cutting tool, comprising a revoluble shaft provided with a longitudinal slot and with keyways, a pair of oppositely-disposed comb-shaped cutters mounted in said slot and likewise provided with keyways, and keys for detachably engaging said keyways.

3. A worm-wheel-cutting tool, comprising a revoluble shaft provided with longitudinal slots, a pair of comb-shaped cutters provided with oppositely-disposed beveled shanks for engaging said slots, and means for detachably securing said shanks in said slots.

4. A worm-wheel-cutting tool, comprising a revoluble shaft provided with a longitudinal slot and with keyways, a pair of oppositely-disposed cutters, each having a thick edge provided with an operating-surface and also a comparatively thin body portion provided with a keyway, said cutters being sandwiched in said longitudinal slot and held therein by keys.

KARL KNAPPE.

Witnesses:
HENRY HASPER,
FRANK H. MASON.